United States Patent [19]
Kawamoto et al.

[11] Patent Number: 5,382,854
[45] Date of Patent: Jan. 17, 1995

[54] ELECTRICAL MOTOR DRIVE APPARATUS WITH PLANETARY GEARING

[75] Inventors: Mutsumi Kawamoto; Satoru Tanaka, both of Aichi; Mitsugi Yamashita, Tokyo, all of Japan

[73] Assignee: Kabushikikaisha Equos Research, Japan

[21] Appl. No.: 94,902

[22] Filed: Jul. 22, 1993

[30] Foreign Application Priority Data

Jul. 29, 1992 [JP] Japan .................. 4-202673
Jul. 29, 1992 [JP] Japan .................. 4-202674

[51] Int. Cl.⁶ .................. H02K 51/00; B60K 7/00
[52] U.S. Cl. .................. 310/67 R; 310/83; 310/75 R; 180/65.6
[58] Field of Search .......... 310/67 R, 75 C, 75 R, 310/83, 99, 90, 52, 58; 180/65.5, 65.6, 65.7

[56] References Cited

U.S. PATENT DOCUMENTS

| | | | |
|---|---|---|---|
| 1,577,304 | 3/1926 | Schurch | 180/65.5 |
| 2,039,513 | 5/1936 | Baker | 180/65.5 |
| 3,347,333 | 10/1967 | Edwards | 180/65.5 |
| 3,770,074 | 11/1973 | Sherman | 180/65.5 |
| 3,812,928 | 5/1974 | Rockwell et al. | 180/65.5 |
| 3,897,843 | 8/1975 | Hapeman et al. | 180/65.5 |
| 4,744,564 | 1/1989 | Iijima et al. | 180/65.5 |
| 5,087,229 | 2/1992 | Hewko et al. | 475/149 |
| 5,156,579 | 10/1992 | Wakuta et al. | 475/161 |
| 5,163,528 | 11/1992 | Kawamoto et al. | 180/65.5 |

*Primary Examiner*—Kristine L. Peckman
*Assistant Examiner*—D. R. Haszko
*Attorney, Agent, or Firm*—Lorusso & Loud

[57] ABSTRACT

A motor drive apparatus for an electric vehicle has a case attached to a vehicle body; an output axle which rotates relative to the case; an electric motor having a magneto stator secured to an inside wall of the case and a rotor which faces the magneto stator with a predetermined clearance and rotates relative to the case; and a planetary gear unit provided inside of the rotor and consisting of three components of a sun gear, a ring gear and a carrier. The electric motor speed is output from the output axle through the planetary gear unit.

9 Claims, 2 Drawing Sheets

FIG. I

ELECTRICAL MOTOR DRIVE APPARATUS WITH PLANETARY GEARING

BACKGROUND OF THE INVENTION

1. Field of the Invention

This invention is broadly concerned with a motor drive apparatus for moving a vehicle and is intended particularly to be used in an electric vehicle which employs wheel motors for movement thereof.

2. Description of the Related Art

A conventional electric vehicle has a battery and an electric motor, wherein the electric motor is adapted to change electric power stored in the battery into a rotational output to rotate driving wheels. A relatively high motor speed is appropriately reduced by a deceleration means such as a differential gear unit between the electric motor and the driving wheels to control the travelling speed of the vehicle.

Another type electric vehicle employs wheel motors inside of respective fenders, with each wheel motor driving one vehicle drive wheel. In this type electric vehicle, a planetary gear unit is generally used as a deceleration means to effectively utilize the inside space of the driving wheel. One type of planetary gear unit conventionally used for this type electric vehicle is oriented relative to a motor drive apparatus case secured to a vehicle body as described and taught by the present applicants in U.S. Pat. No. 5,156,579, issued Oct. 20, 1992 to Wakuta et al., which is entitled "LUBRICATING DEVICE FOR A VEHICLE MOTOR" and in U.S. Pat. No. 5,163,528, issued Nov. 17, 1992 to Kawamoto et al., which is entitled "WHEEL MOTOR PROVIDED WITH A REDUCTION GEAR".

More specifically, a magneto stator of the electric motor is fixed to the motor drive apparatus case and a corresponding rotor is arranged inside of the magneto stator to rotate relative to the motor drive apparatus case. The rotor of the electric motor is connected with a sun gear of the planetary gear unit via an output axle thereof.

Referring now to other components of the planetary gear unit, a ring gear is fixed to the motor drive apparatus case and a carrier having at least one pinion meshing both with the sun gear and the ring gear is connected to an axle of a vehicle drive wheel. The axle for the vehicle drive wheel is rotatably supported at a central portion thereof by bearings in the motor drive apparatus case.

Accordingly, the motor speed is reduced by the above-mentioned planetary gear unit and then transmitted to the vehicle drive wheel at a desired rotary speed to move the vehicle.

It is known that the clearance between the magneto stator and the rotor defining the electric motor should be narrowly and carefully maintained to obtain stable operation of the electric motor. Accordingly, the electric motor must have both longitudinal end portions of the output axle of the rotor rigidly supported to obtain stable operation.

However, the structure described in the prior application entitled "MOTOR DRIVE APPARATUS WITH DECELERATION UNIT AND AN ELECTRIC VEHICLE USING THE SAME" suffers from a disadvantage in terms of stable operation. Specifically, while one end portion of the output axle for the rotor is rotatably supported by the case via a bearing assembly, the other end portion thereof is not supported by the case but, rather, connects to the sun gear which engages the ring gear secured to the case through the pinion. Therefore, upon acceleration of the motor speed up to the travelling speed of the vehicle, the pinion meshing with the sun gear also accelerates, which causes an undesirable vibration of the output axle of the rotor at the end unsupported by the case, so that the clearance between the magneto stator and the rotor cannot be narrowly and carefully maintained.

Furthermore, when the electric vehicle goes around a bend at high speed, the output axle for the inside driving wheel is urged by centrifugal force outwardly of the planetary gear unit and, at the same time, that of the outside vehicle driving wheel is oppositely affected, i.e. urged toward the planetary gear unit. When the electric vehicle rattles on a bumpy road with hard shock to the suspension assembly provided for the driving wheel, the output axles of the driving wheels may be damaged.

But, as already mentioned, the output axle of the driving wheel is only supported, at the center portion thereof, in the bearing assembly relative to the motor drive apparatus case, so that the output axle of the driving wheel tends to be easily vibrated by any external forces acting axially and/or radially thereon. As a result, it is likely that the pinion attached to the carrier will be irregularly urged toward the sun gear and the ring gear with an unstable force to cause a biased wear and/or nicking of the pinion, sun and ring gears and unusual noise will emanate from the planetary gear unit.

One solution providing a narrow clearance between the magneto stator and the rotor is a rotor having a hollow portion and an output axle which is stably supported, at both longitudinal ends thereof, on the motor drive apparatus case via bearing assemblies. The planetary gear unit is mounted in the hollow portion of the rotor. However, the bearing assemblies which rotatably support the rotor should be large in size because the planetary gear unit is provided in the hollow space of the rotor. As the peripheral velocity of each bearing supporting the rotor becomes high, friction-loss within the motor may increase. Because the sun gear in such a planetary gear unit is supported by additional bearing assemblies, the result is an increase in the number of bearing assemblies in the motor drive apparatus, which is costly. This structure still involves the disadvantages of biased wear and nicking of the pinion, sun and ring gears or emanates unusual noise from the planetary gear unit.

It is an object of the present invention to provide a motor drive apparatus consisting of minimum components to avoid biased wear and nicking of the pinion, sun and ring gears, to avoid unusual noise from the planetary gear unit and to decrease the friction-loss of the motor.

SUMMARY OF THE INVENTION

The present invention relates to a motor drive apparatus for a vehicle which includes: a motor drive apparatus case attached to a vehicle body; an output axle mounted to rotate relative to the motor drive apparatus case; an electric motor having a magneto stator secured to an inside wall of the motor drive apparatus case and a rotor which faces the magneto stator with a predetermined clearance therebetween and rotates relative to the motor drive apparatus case; and a planetary gear unit provided inside of the rotor and consisting of three components, i.e. a sun gear, a ring gear and a carrier. A first of the three components is connected to the rotor and supported relative to the motor drive apparatus case, a second of the three components is secured to the motor drive apparatus case and the third of the three components transmits only self-revolution around the first component to the output axle.

Preferably, the first component is the sun gear, the second component is the ring gear and the third component is the carrier. Furthermore, the carrier should consist of a pinion and a carrier cover which rotatably supports the pinion and has plural splines, and the output axle should have corresponding splines to thereby receive rotation of the carrier.

The rotor of the electric motor and the first component of the planetary gear unit are supported by the motor drive apparatus case by means of bearing assemblies.

The motor drive apparatus case is provided with a lower pump space to cool the electric motor and to lubricate the planetary gear unit.

The output axle extends outwardly from the motor drive apparatus case and is provided with plural splines thereon so that a wheel hub having corresponding splines interconnects to the output axle, the wheel hub integrally having a wheel disk for a tire and a brake disk when interconnected to the output axle. The wheel hub is supported in a bearing assembly disposed at a center portion of the axis of rotation of the tire, so that the wheel hub rotates relative to the motor drive apparatus case. The bearing assembly is preferably a double angular bearing.

The motor drive apparatus could further have a disk brake device between the motor drive apparatus case and the wheel disk to regulate rotary speed of the output axle.

Such an arrangement for supporting the rotor has the merit of providing the same level of accuracy as a direct supporting system wherein the rotor is directly supported on the case. Accordingly, the electric motor can have both longitudinal end portions of the output axle of the rotor rigidly supported to obtain a stable operation thereof.

The bearing assembly supports not only the rotor but also the sun gear axle, thereby reducing the number of necessary bearing assemblies for the rotor and the planetary gear unit and reducing total frictional resistance.

In such a structure, the vibration of the output axle does not influence the rotation of the carrier, so that the pinion attached to the carrier is not irregularly urged toward the sun gear and the ring gear, thereby preventing biased wear and nicking of the pinion, sun and ring gears and reducing unusual noise from the planetary gear unit.

DETAILED DESCRIPTION OF THE PREFERRED EMBODIMENT(S)

Figure 1:
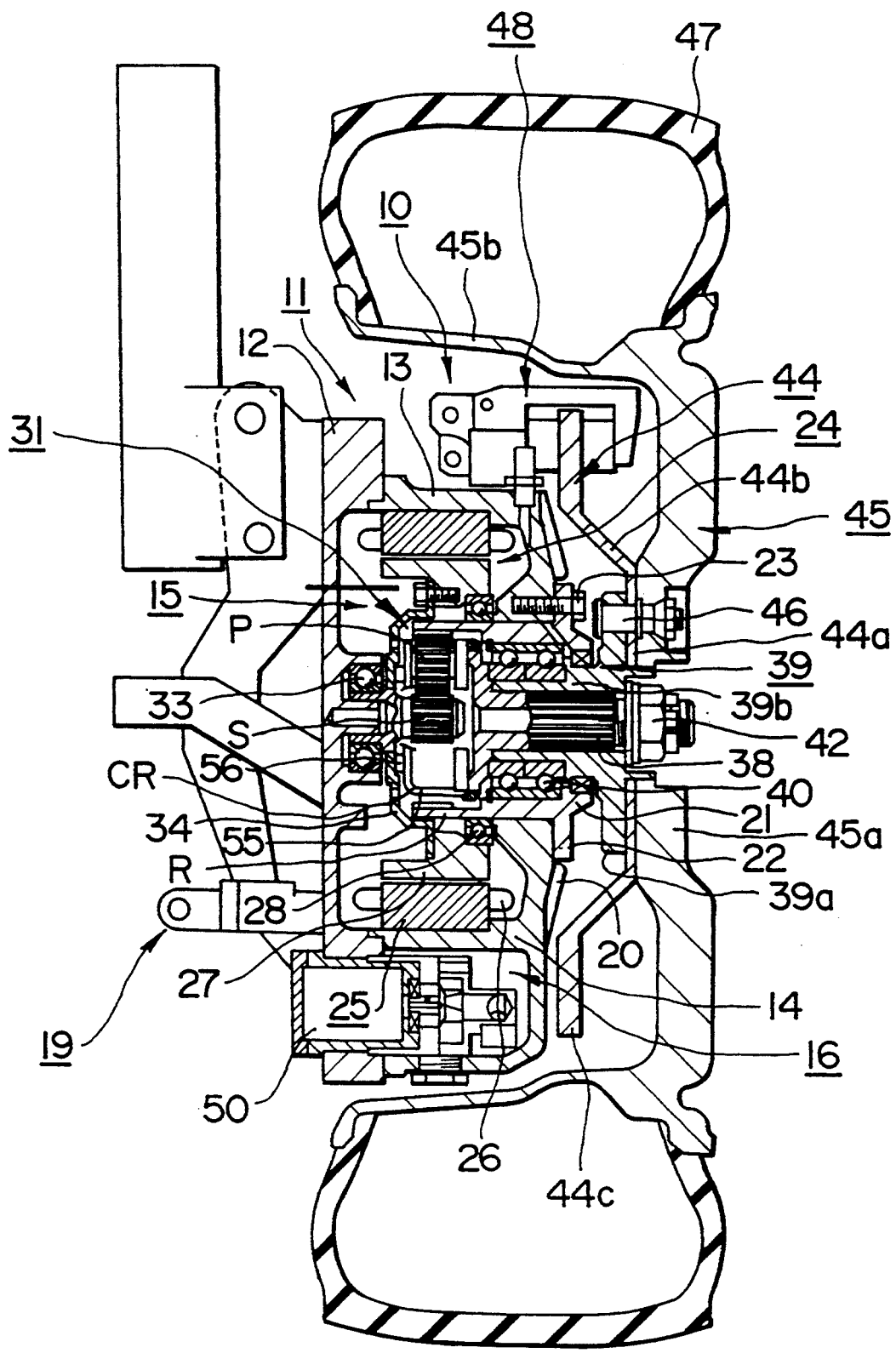
FIG. 1 is a sectional view of a preferred embodiment of a motor drive apparatus in accordance with the present invention.
Figure 2:
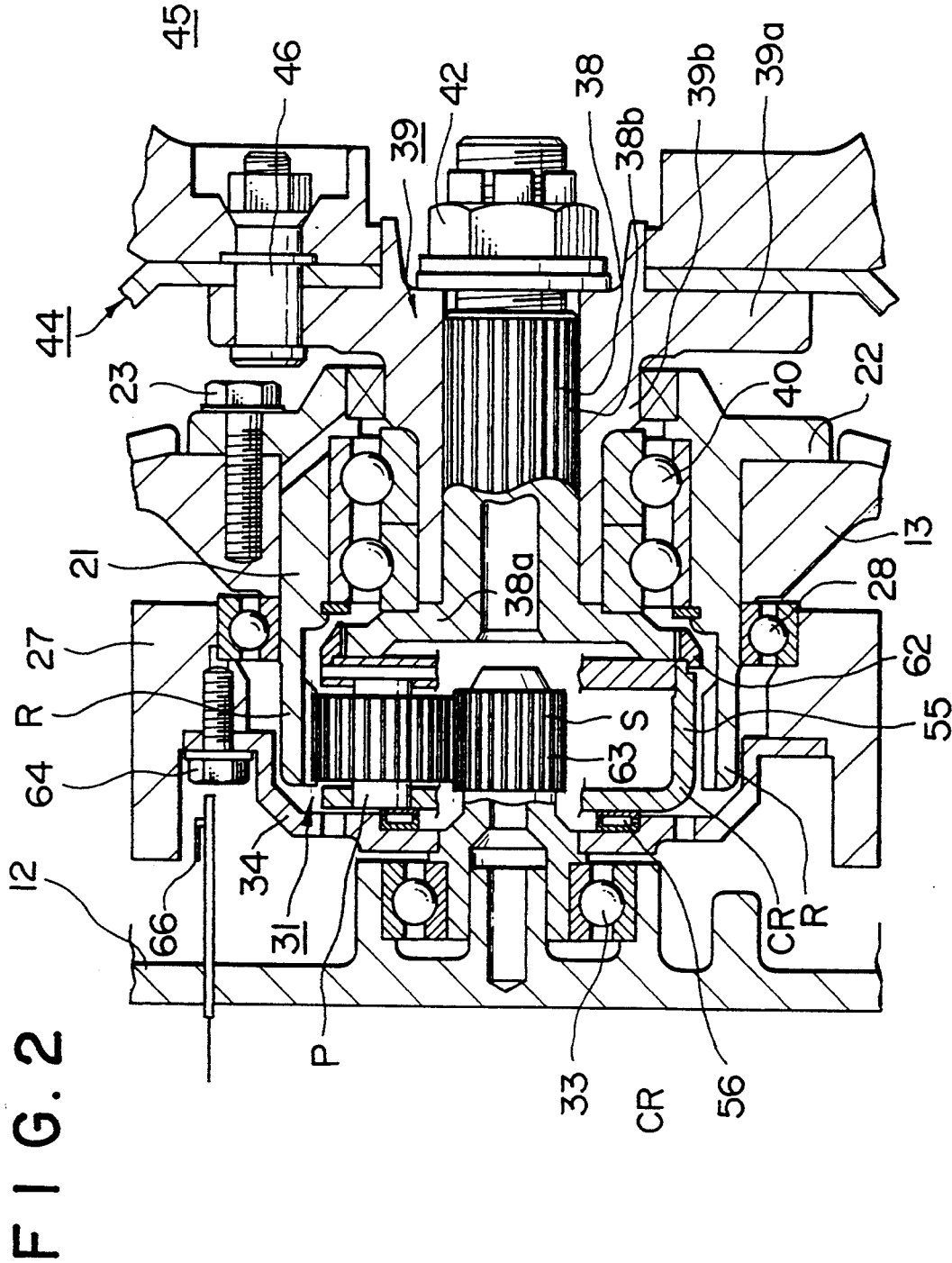
FIG. 2 is an enlarged sectional view of the motor drive apparatus shown in FIG. 1.

A preferred embodiment of the present invention will now be described with reference to the drawings. Certain terminology will be used in the following description for convenience in reference only and is not intended to be limiting. The words "up", "down", "right" and "left" designate directions in the drawings to which reference is made. The words "in" and "out" refer to directions toward and away from, respectively, the geometric center of the device and designated parts thereof. Such terminology will include derivatives and words of similar import.

As can be seen from the drawings, a drive apparatus case 11 includes a first case half-member 12 having a plate shape and a second case half-member 13 having a cup shape which are connected together by plural bolts (not-shown). When the case half-members 12 and 13 are bolted to each other, two compartments divided by an inner wall 14 of the second case half-member 13 are formed, of which one is a motor space 15 having a round shape in section and the other is a pump space 16 under the motor space 15.

The drive apparatus case 11 is adapted to be fastened to a chassis of an electric vehicle (not-shown) via a strut-type suspension 19. On an outer surface of the drive apparatus case 11 are provided a plurality of cooling fins 20 for radiating heat.

The case half-member 13 has a central opening which receives a sleeve 21 connected thereto at a flange portion 22 by means of bolts 23. The sleeve 21 extends inwardly within the motor space 15 and is integrally provided with a ring gear R at the left end thereof.

The motor space 15 receives therein a motor assembly 24, more specifically, supports on its interior wall a magneto stator 25 on which a stator coil 26 is wound. A corresponding rotor 27 is provided inside of the magneto stator 25 with a predetermined spacing from the magneto stator 25. The rotor 27 has a through hole at the center thereof and is rotatably supported on the sleeve 21 with the right end portion thereof resting on the sleeve 21 via a bearing assembly 28 as shown in FIG. 1. There is provided a sensing element 66 which is inserted through the case half-member 12 to a position near the left end portion of the rotor 27 to detect a magnetic pole.

Inside of the motor assembly 24 is a planetary gear unit 31. The planetary gear unit 31 includes a sun gear S, a ring gear R and a carrier CR provided with a pinion P. The sun gear S is driven by the motor assembly 24 and transmits the same drive power to the carrier CR which suitably reduces the motor speed.

The ring gear R integrally provided at the left portion of the sleeve 21 is concentric with the sun gear S. The sun gear S is integrally formed at a forward end of a sun gear axle 63 and its rear end is rotatably supported by the case half-member 12 via a bearing assembly 33.

The sun gear axle 63 further has a sun gear flange 34 which is fixed to the sun gear axle 63 by welding near the bearing 33 and which has an outer peripheral portion connected to the rotor 27 by bolts 64. As has been mentioned above, the right side portion of the rotor 27 is rotatably supported on the sleeve 21 relative to the case half-member 13 via the bearing assembly 28 and the left side portion of the rotor 27 is rotatably supported in the bearing assembly 33 relative to the case half-member 12 via the sun gear flange 34 and the sun gear axle 63. It should be understood that the bolts 64 can be replaced with other members which connect the sun gear flange 34 with the rotor 27.

Such an arrangement for supporting the rotor 27 has the merit of providing the same level of accuracy as a direct supporting system wherein the rotor 27 is directly supported on the case half-members. The bearing assembly 33 not only supports the rotor 27 but also the sun gear axle 63, which reduces the number of necessary bearing assemblies for the rotor 27 and the planetary gear unit 31 and which reduces total frictional resistance.

The carrier CR has a carrier cover 55 which rotatably supports the pinion P and transmits the drive power from the planetary gear unit 31 to an output axle 38. Thrust needle bearings 56 are provided between the carrier cover 55 and the sun gear flange 34 and move relative to each other.

The output axle 38 is coupled to a wheel hub 39 defined by a flange portion 39a and a sleeve portion 39b. An inside portion of the sleeve portion 39b is splined to the outer portion of the output axle 38. On the outer periphery of the wheel hub 39, around the rotational axis of tire 47, is a double angular bearing 40 rotatably supported in relation to the sleeve 21. Accordingly, it can be said that the output axle 38 is rotatably supported in relation to the case half member 13, by the sleeve portion 39b of the wheel hub 39 through the double angular bearing 40.

Accordingly, rotation of the rotor 27 in the motor assembly 24 is input to the sun gear S through the sun gear flange 34 and then reduced by the planetary gear unit 31 and then transmitted to the output axle 38 and the wheel hub 39 from the carrier CR. Nut 42 prevents the wheel hub 39 from coming off the output wheel axle 38.

The wheel hub 39 supports at the right end portion thereof a brake disk 44 and a wheel disk 45 by means of bolts 46. The wheel disk 45 has a cup shape with a bottom portion 45a integral with a cylindrical portion 45b extending from the outer periphery of the bottom portion 45a for mounting a tire 47. Rotation of the wheel hub 39 is transmitted to the tire 47 through the wheel disk 45.

The brake disk 44 has a plate shape with a flat center portion 44a which is secured to the flange portion 39a of the wheel hub 39 by connection to the bottom portion 45a of the wheel disk 45. The brake disk 44 includes this flat center portion 44a, an inclined portion 44b extending from the outer periphery of the brake disk 44 inclined toward the vehicle body and a flat outer portion 44c radially extending from the outer periphery of the inclined portion 44b.

A brake caliper 48 in an upper portion of the case half-member 13 catches an upper portion 44c of the brake disk to brake rotation of the brake disk. The brake caliper 48 comprises two pads in a caliper body to frictionally engage the brake disk 44 when the pads are urged together by brake pistons (not shown).

When the tire 47 receives a laterally external force in travelling, the output axle 38 rotatably supported in the double angular bearing 40 tends to be axially moved, adversely affecting the arrangement between the sun gear S and the ring gear R, accompanied by the pinion P in the planetary gear unit 31, to thus cause a biased wear and nicking of the pinion, sun and ring gears and noise to emanate from the planetary gear unit.

Accordingly, the motor drive apparatus of this invention includes structure between the carrier cover 55 and the output axle 38 which allows only rotational motion to be transmitted therebetween. Specifically, the output axle 38 includes a flange portion 38a having a splined outer periphery and an axle portion 38b, and the carrier cover 55 is formed with a ring member 62 welded thereto which has mating splines at a contacting portion whereby only the rotation of the carrier cover 55 is transmitted to the output axle 38. Incidentally, the axle portion 38b of the output axle 38 projects outwardly though the opening of the case half-member 13.

In such a structure, the axial vibration of the output axle 38 does not influence the rotation of the carrier cover 55, so that the pinion P attached to the carrier CR is not irregularly urged to the sun gear and the ring gear. Biased wear and nicking of the pinion, sun and ring gears is thereby avoided and unusual noise from the planetary gear unit is reduced. The splined coupling between the carrier cover 55 and the output axle 38 could be replaced with another coupling means which allows only rotational power transmission, such as a uniform joint.

In the above-described embodiment, as the planetary gear unit 31 is designed to receive the motor power through the sun gear S and output it from the carrier CR, even when either the sun gear or the ring gear outputs the rotation power to the output axle, one of the three elements of the planetary gear unit 31 may be influenced by an external force, so that a buffer should be employed.

As has been mentioned, the drive apparatus case 11 is formed with the pump space 16 wherein an oil pump 50 is provided to circulate oil stored in an oil reservoir, thus cooling the stator coil 26 and lubricating the planetary gear unit 31.

It will be noted that a space between the cylindrical portion 45b of the wheel disk 45 and the drive apparatus case 11 is utilized not only to provide the pump space 50 but also to house the brake caliper 48.

The brake caliper 48 should be provided as two sets above the brake disk 44 preferably at spaced intervals. Such an arrangement of the two brake calipers 48 allows use of smaller brake pistons for each brake caliper, which makes good use of the space between the drive apparatus case 11 and the wheel disk 45. Furthermore, the heat generated in the brake calipers 48 when braking is radiated effectively due to two brake calipers, each secured to the drive apparatus case 11, so that the heat generated does not adversely influence the stator coil 26.

The drive apparatus case 11, the brake disk 44 and the brake caliper 48 are completely housed within space 10 defined by the bottom portion 45a and the cylindrical portion 45b of the wheel disk 45, made possible by the fact that the planetary gear unit 31 is received in the motor assembly 24 provided in the drive apparatus case 11. Hence, even if the tire 47 is a narrow one, the drive apparatus case 11 is covered by the wheel disk 45, so that when the electric vehicle according to the present invention happens to run off and down the road shoulder, the motor assembly 24 will not be damaged thereby. Furthermore, as the ground engagement point of the tire 47 is close to the point where the wheel is supported by the suspension 19, the riding quality and the controllability of the vehicle are improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A motor drive apparatus for a vehicle, comprising:
   a casing attached to the body of the vehicle;
   an output axle rotatably supported by said casing for rotation relative to said casing;
   an electric motor including a magneto stator secured to an inside wall of said casing and a rotor concentric with the magneto stator with a predetermined clearance therebetween;
   first support means, within said casing, for rotatably supporting said rotor for rotation relative to said casing and attached between said casing and said rotor;
   a planetary gear unit provided inside of the rotor and comprising a sun gear, a ring gear and a carrier, said ring gear being fixed to said casing, said carrier engaging said ring gear and said sun gear, revolving around the sun gear and connected to and driving said output axle;
   a connecting member, attached to both said sun gear and said rotor, for fixing said sun gear relative to said rotor; and
   second support means, within said casing, for rotatably supporting said sun gear for rotation relative to said casing and attached between said casing and said sun gear.

2. The motor drive apparatus according to claim 1, wherein the carrier comprises a pinion and a carrier cover which rotatably supports the pinion and has plural splines, and wherein said output axle has splines mated with said plural splines to thereby receive rotation of the carrier.

3. The motor drive apparatus according to claim 1, wherein said rotor is supported within said casing by bearing assemblies.

4. The motor drive apparatus according to claim 1, wherein said casing is provided with a lower pump space for oil to cool said electric motor and to lubricate said planetary gear unit.

5. The motor drive apparatus according to claim 1, wherein said output axle extends outwardly from said casing and is provided with plural splines for mounting a wheel hub having corresponding splines, said wheel hub having an integral wheel rim for a tire and a brake disk.

6. The motor drive apparatus according to claim 5, further comprising a brake disk device between said casing and the brake disk to regulate the rotational speed of said output axle.

7. The motor drive apparatus according to claim 5, wherein said wheel hub is supported in a bearing assembly disposed at the central rotational axis of the tire, so that the wheel hub rotates relative to said casing.

8. The motor drive apparatus according to claim 7, wherein the bearing assembly is a double angular bearing.

9. A motor drive apparatus according to claim 1 wherein said planetary gear unit is located wholly within said rotor.

* * * * *